Figure 1:
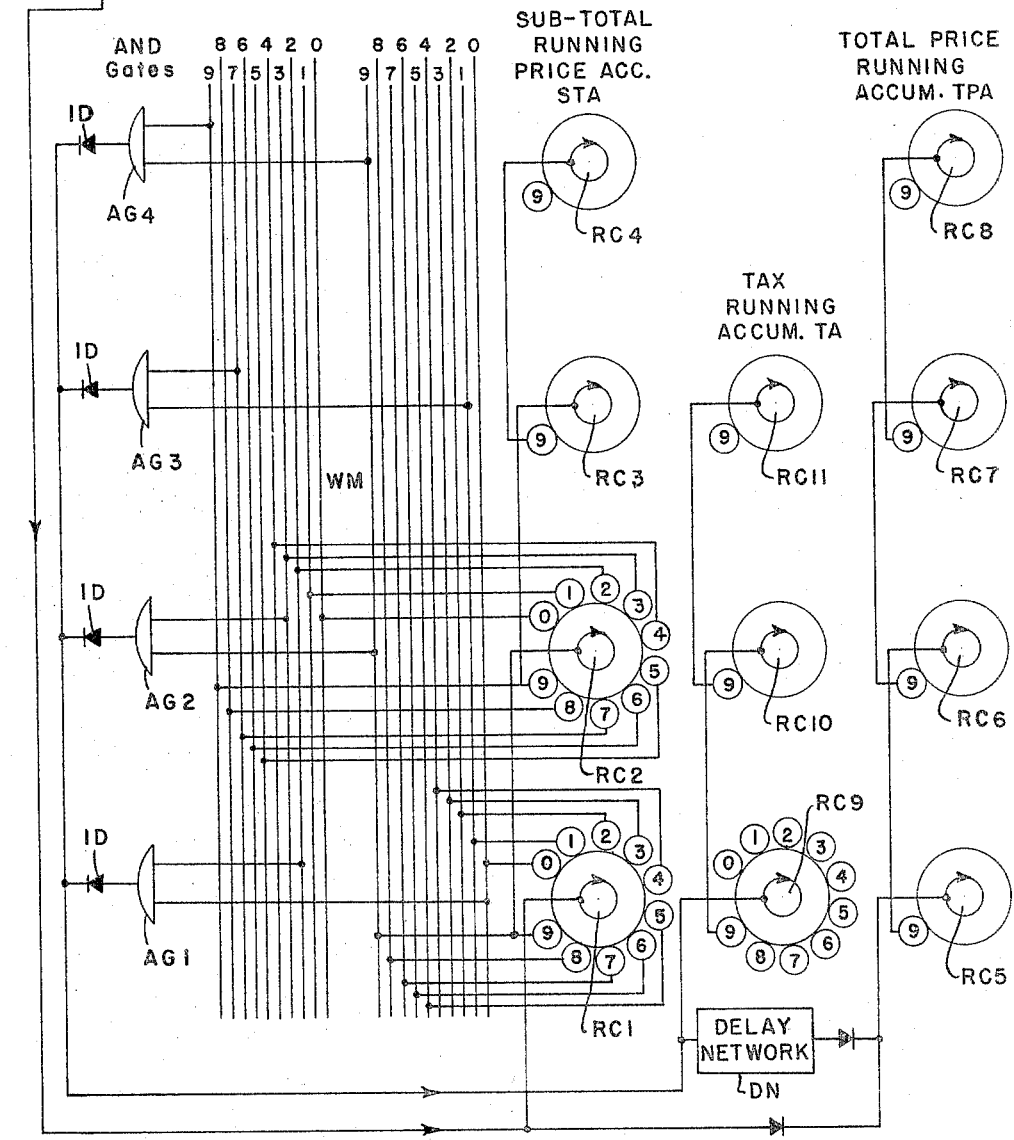

Aug. 16, 1966     R. M. BERLER     3,267,438

TAX COMPUTATION AND BILLING SYSTEM FOR CASH REGISTER USE

Filed Dec. 12, 1962     4 Sheets-Sheet 1

INVENTOR
ROBERT M. BERLER
BY
*Stuart F. Moore*
ATTORNEY

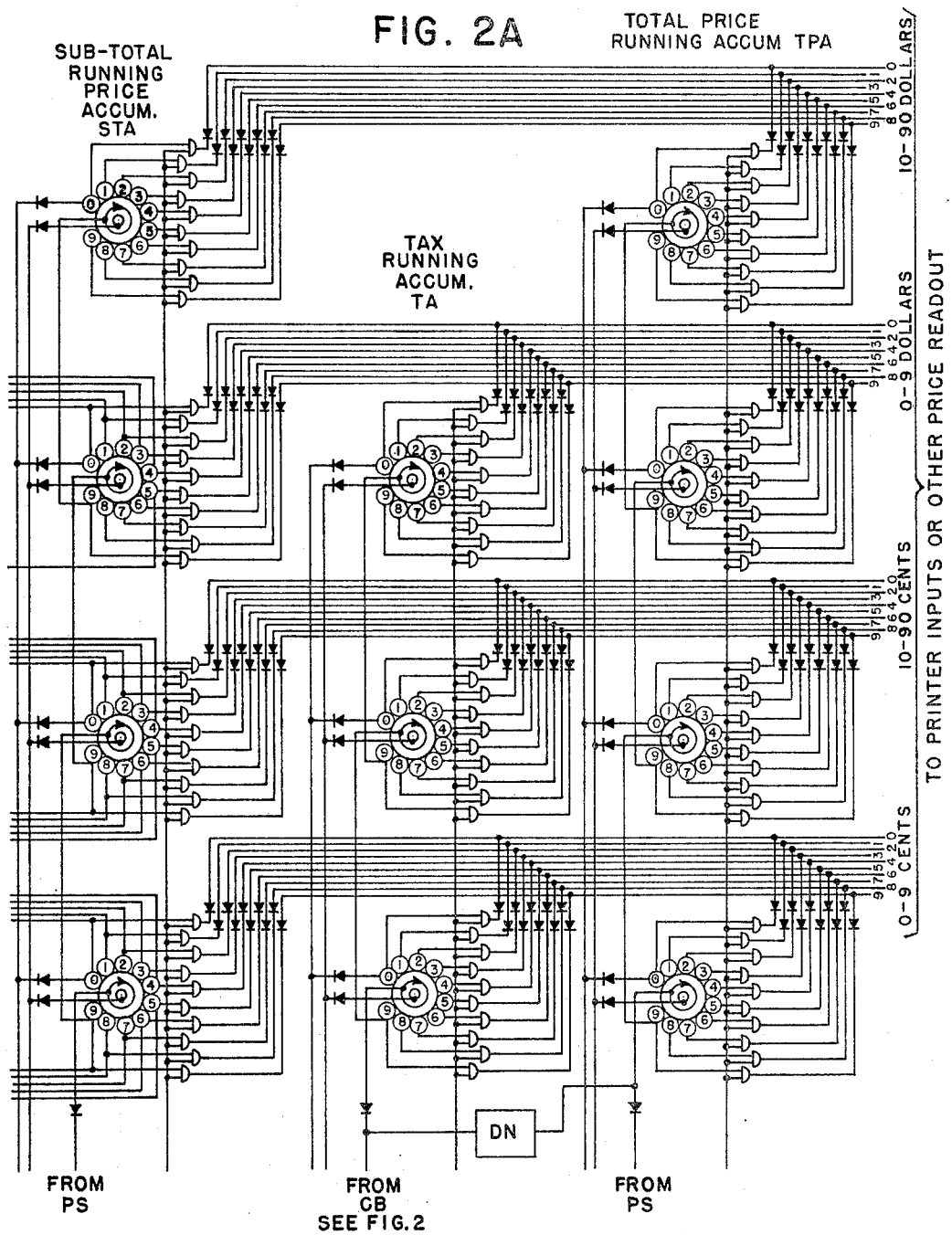

Aug. 16, 1966  R. M. BERLER  3,267,438
TAX COMPUTATION AND BILLING SYSTEM FOR CASH REGISTER USE
Filed Dec. 12, 1962  4 Sheets-Sheet 4

INVENTOR
ROBERT M. BERLER
BY
ATTORNEY

United States Patent Office 3,267,438
Patented August 16, 1966

3,267,438
TAX COMPUTATION AND BILLING SYSTEM FOR CASH REGISTER USE
Robert M. Berler, Westport, Conn., assignor to American Machine & Foundry Company, a corporation of New Jersey
Filed Dec. 12, 1962, Ser. No. 244,068
8 Claims. (Cl. 340—172.5)

The invention relates to accounting systems and apparatus and particularly to electronic price computing and billing systems and apparatus and tax computation circuit arrangements used therewith.

The present invention is particularly adapted for systems and apparatus used in connection with the retail sale of food commodities or services to the general public in restaurants and hotels, and will be so described. It should be understood, however, it is applicable as well to the sale of other commodities or services.

It is well known that in certain areas or locales, taxes are levied on the sale of food, other commodities, or services when the total price of a single order exceeds a minimum value. Such tax may vary in accordance with the total price in excess of that value and are usually passed on to a customer or consumer in the form of additions to a bill.

The copending U.S. application of Alpert, Berler and Townsend, Serial No. 219,222, filed August 24, 1962, discloses apparatus utilizing an electronic computer operative on a time sharing basis to provide ordering, price computing and billing functions involved in the sale of varying customer orders of a number of different items to provide information in pulse form as to the number of items sold on each order, the total item price, the total price of the order and other necessary order information. The resulting pulse information is used to operate an associated printer to provide a customer's bill containing all order information in printed form. This computer provides means including a binary-to-decimal converter for producing decimal pulses representing in number the total item prices for a number of commodity items sold on an order, and two accumulators each composed of ring counters in decade configuration controlled by these pulses for respectively accumulating information on the Item Total Price and Total Running Price.

One object of the invention is to improve a system of the above general type by adding tax computation and billing functions thereto.

Another object is to electronically compute a tax, or various combinations of taxes, and include them in a bill of sale.

And, another object is to provide relatively simple and economical electronic apparatus to compute a sub-total running price, a running tax on the sub-total price, and a total order price including the tax for a number of items or services sold.

Still, another object is to provide means to electronically compute a running tax on the price of a plurality of items sold on each order and to electronically combine this running tax with a running sub-total price to form a total price which includes the tax on the order.

The present invention contemplates an electronic circuit arrangement including basically the combination of three accumulators each of ring counters in decade configuration and a group of multi-input AND gates respectively representing different tax breaks, so interconnected that in response to an input comprising a series of pulses representing one cent each and in total number proportional to the total price of a number of commodity items, or services sold, the respective accumulators will accumulate information as to the sub-total running price, the running tax on this sub-total and the total price of the order including the tax for use to operate an associated printer for printed billing.

A practical embodiment of this basic circuit arrangement includes a multipulse generator associated with one or more of the selected tax break gates and responsive to the enablement thereof to generate the proper number of single pulses representing one cent each and to transmit them into the running tax accumulator, and through a delay network into the total price accumulator, for counting and storage thereby, and an additional step ring counter with associated flip-flop devices for properly controlling the operation of non-repeating and repeating groups of the tax break gates, for a fixed tax of more than one cent at given tax levels and a tax on a nonrepeating or repeating percentage basis at other tax levels.

Figure 2:
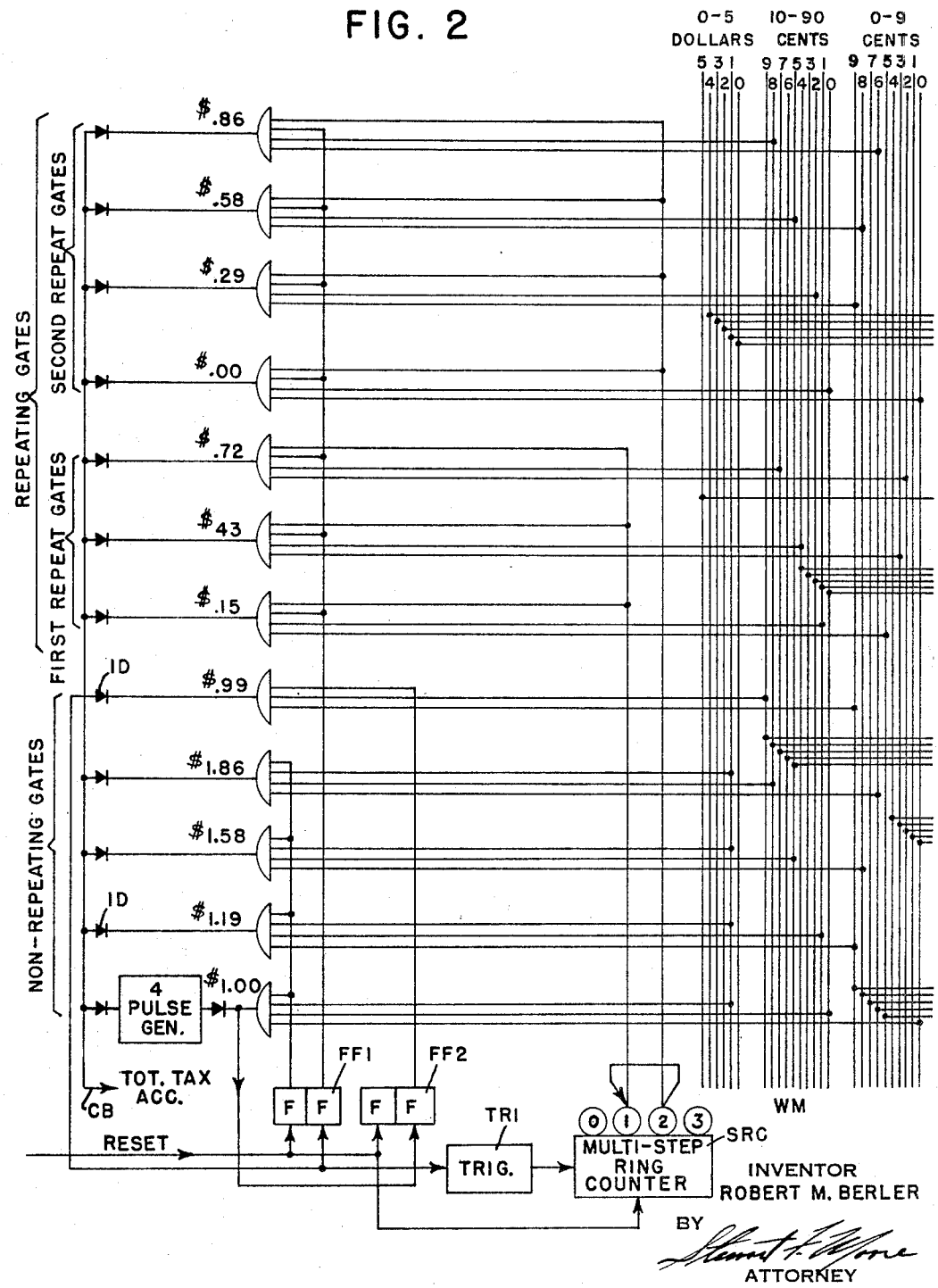
Figure 3:
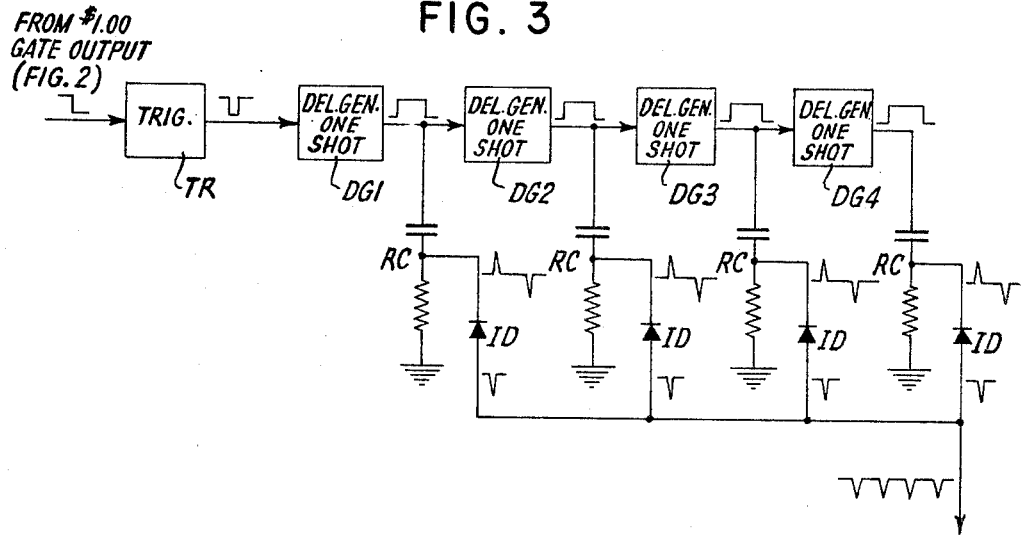
Figure 4:
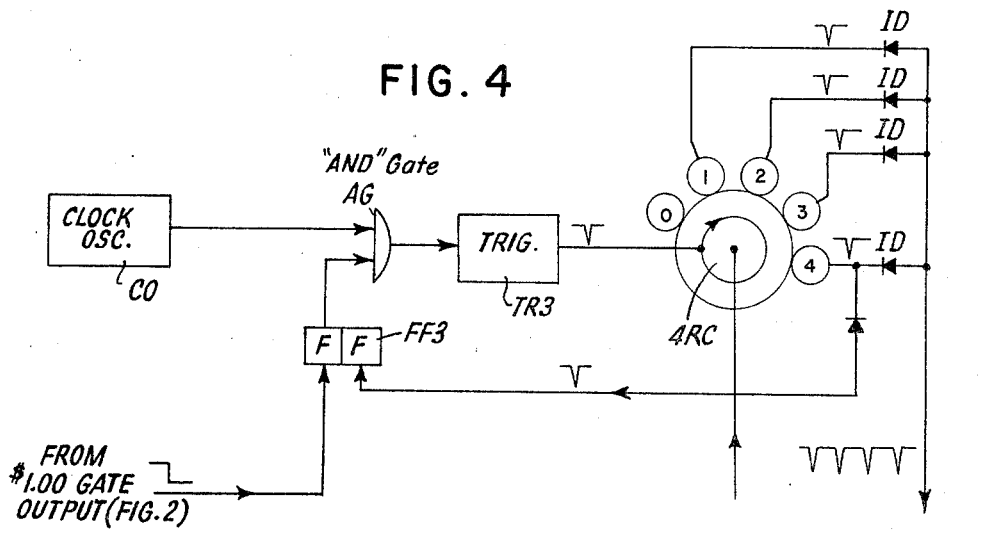

The foregoing and other objects and features of the invention will be better understood from the following detailed description thereof together with the accompanying drawings in which:

FIG. 1 is a functional circuit diagram of a tax and billing logic in accordance with the invention;

FIGS. 2 and 2A, in combination, form a circuit diagram of a practical embodiment of the basic system in accordance with the invention which is applicable for use in a particular locale with a particular tax structure; and FIGS. 3 and 4 are block diagrams of alternative multipulse generators which may be used in the tax computing system of FIGS. 2 and 2A.

Referring to FIG. 1, the basic computing arrangement shown therein includes three electronic accumulators comprising a sub-total running price accumulator STA, a running tax accumulator TA and a total price accumulator TPA each composed of a number of electronic recirculating unidirectional ring counters of decade configuration, electronically equivalent to a 10-position, unidirectional stepping switch, as shown diagrammatically by the usual coaxial ring symbol. Each ring counter will produce an output on one of its 10 positions (0 to 9), one at a time, consisting of a D.C. voltage with a step function as it changes from off to on, or one to off. The recirculating ring counters in each accumulator so interconnected that the tenth (final) stage or position generates a carry signal which moves the following counter by one step. For example, every time a cents unit counts through the tenth stage, an interconnected ten cent counter is advanced one step. Likewise, a ten cent counter at its tenth stage advances an associated dollar counter. The cents ring counter acts upon every applied pulse, or bit, from an associated pulse source, the 10's unit runs at $1/10$ the speed thereof and the 100's or dollar unit, is driven at $1/100$ the bit rate.

It will be noted from the diagram of FIG. 1, that four counters are used in each subtotal running accumulator STA and the total price accumulator TPA, designated $RC_1$ to $RC_4$ and $RC_5$ to $RC_8$, respectively, so each is able to count as high as $99.99; but that only three counters are used in the running tax accumulator TA, designated as $RC_9$ to $RC_{11}$ so it is able to count to $9.99.

The unidirectional ring counters used in accumulators STA, TA, and TPA are preferably as disclosed in the copending patent application of W. J. Mahoney and N. Murthy, S.N. 184,766, filed April 3, 1962, which are of the type having a single active element (4-layer diode) for each digit.

The inputs of accumulators STA and TPA are connected in parallel to a source PS of individual pulses, each representing one cent, which in number correspond to the total price of the sale of a number of items, or services. For example, the source of individual pulses may be the decimal pulses produced in the output of the binary to decimal converter or an order in the ordering, price computing and billing system disclosed in the aforementioned patent application, S.N. 219,222.

The input terminals of a group of multi-input AND gates $AG_1$, $AG_2$, $AG_3$, $AG_4$ ..., respectively representing different tax breaks, for example $.20, $.39, $.71, $.99 ..., as shown, are respectively connected to bus wires in the matrix WM, which may be a printed circuit wiring arrangement, comprising several columns of parallel bus wires representing cents, tenths, dollars. The columns of wires of matrix WM, in turn, are connected to the appropriate output connections of the subtotal ring counters $RC_1$ to $RC_4$ of the subtotal running price accumulator STA so each bus wire connects to a single corresponding ring counter output. The value of a tax break depends upon the particular combination of bus wires to which the gate is connected.

The pulses each representing one cent are fed into the input of the subtotal accumulator STA and the total price accumulator TPA, which count and store this pulse information.

As individual pulses are fed into the subtotal accumulator STA, various bus wires of matrix WM are energized by the outputs of ring counters $RC_1$ to $RC_4$ which correspond to the decade information in them. As the count proceeds, each gate $AG_1$, $AG_2$, etc. will be enabled, one at a time, and in proper order, as all inputs to each gate are energized. Each time a gate is thus enabled, it delivers a step function voltage from its output and through an individual isolation diode ID into the common bus CB leading to the running tax accumulator TA in the form of a single pulse. Thus, as the subtotal price is being added up, the running tax will be accumulating and will, at all times, be up to date for the subtotal accumulated.

Simultaneously, the total price accumulator TPA is following the subtotal accumulator STA in its indications and, in addition, a portion of the tax pulse fed into the tax accumulator TA also is fed into the total price accumulator TA through a delay network DN to yield a running total price consisting of the subtotal price plus the tax. The purpose of the delay network DN is to prevent tax and subtotal pulses from entering the total price accumulator TPA at the same time.

The output of each step of each ring counter $RC_5$ to $RC_8$ is then provided through suitable gate circuits and isolation detector means to an electromechanical printer, in a similar manner to that described in the aforementioned copending patent application, S.N. 219,222, or may be connected to a suitable type of optical read-out device (not shown).

Since the tax varies as to locale, no single circuit would ordinarily be suitable to handle all the various situations. By the use of specialized circuits, a means has been found to overcome this difficulty, as shown in FIG. 2.

In a specific locale, for example, the following is the present tax schedule for food eaten in restaurants. No tax is paid on food on orders totaling less than one dollar while at one dollar, a tax of 4¢ is applied to the bill. The first group of tax breaks thereafter will occur at $1.19, $1.58 and $1.86, and are not repetitive. At each of these tax breaks, 1¢ is added to the bill. The next group of tax breaks is divided into two parts which are alternately repetitive, thus $2.15, $2.43, $2.72 and $3.00, $3.29, $3.58 and $3.86, repeat as $4.15, $4.43, $4.72 and $5.00, $5.29, $5.58, $5.86, etc.

Referring now to FIGS. 2 and 2A, the circuits for computing the taxes for the foregoing example comprise a group of five nonrepeating 4-input AND gates representing $1.00, $1.19, $1.58, $1.86 and $.99 as indicated; a group of three repeating 4-input AND gates representing $.15, $.45 and $.72; and a second group of four repeating 4-input AND gates representing $.00, $.29, $.58, $.86 as indicated by the attached designations in FIG. 2. These gates have certain of their inputs connected through bus wires in the associated matrix MW to corresponding decade outputs of the subtotal running accumulator STA, and their single outputs connected, with two exceptions, through individual isolation diodes ID to a common bus CB to the input of the running tax accumulator TA.

The output of the $1.00 tax break gate is connected to the set input of a flip-flop FF2 and to a multipulse generator MG, in this case a 4-pulse generator, which is controlled by the output of the $1.00 tax break gate and, in turn, feeds its output through an individual isolation diode ID to the tax accumulator TA.

The output of the $.99 AND gate is connected through its individual isolation diode ID to the set input of flip-flops FF1 and to a trigger circuit $TR_1$ which, in turn, is connected to the input of a multistep ring counter SRC. Ring counter SRC with the associated flip-flops FF1 and FF2, control the operation of the non-repeating and repeating groups of tax break gates in a manner which will now be described.

Initially, the flip-flop devices FF1 and FF2 are in their reset state. In this state, the flip-flop device FF1 provides an enabling voltage to all the non-repeating gates, except the $.99 gate, and no enabling voltage to each of the repeating gates. Flip-flop device FF2 does not supply an enabling voltage to the $.99 gate. As the subtotal accumulator STA adds up the bill, pulses from pulse source PS, starting from zero cents, there is no tax output until $1.00 is reached. At this point, the $1.00 gate will transmit an output, in response to enabling voltage from flip-flop FF1 and output voltage from the subtotal running accumulator STA, to the 4-pulse generator MG which will produce four tax impulses each representing one cent, to set the flip-flop device FF2 which will now supply an enabling voltage input to the $.99 gate. As the sub-total accumulator STA continues to add up the bill, a tax pulse each of one cent value will be produced sequentially at the output of the $1.19, $1.58 and $1.86 tax break gates when accumulator STA arrives at such sums and all of these tax pulses are summed by accumulator TA. When the sub-total accumulator STA reaches $1.99, the $.99 by voltage from flip-flop FF2 and accumulator STA provide an output to set flip-flop device FF1 and cause operation of trigger TR to operate the three-step ring counter SRC stepping it from the "zero" to the "one" position.

The three-step generator SRC is a ring counter which, as diagrammatically shown, is arranged by a feedback loop so that it can count up to two or three steps. In the case shown, it is arranged to count only to two positions. Starting from zero, the first pulse input will cause the ring counter to step to position one. A second pulse input will cause it to step to position two. A third pulse input will cause the ring to step back to position one, etc. If the feedback loop was connected from position three to one, the ring counter would step from zero to positions one, two, three, one, two, three, etc. At the end of computation, the ring counter is reset to the zero position by the system reset, as indicated.

Setting the flip-flop device FF1 causes all the non-repeating gates except the $.99 gate to become disabled while all repeating gates will have an enabling voltage present at one of each of their inputs. Since the ring counter SRC is now on position one, the first set of repeating gates will have an enabling voltage present at each of their second input leads.

As the subtotal accumulator STA continues to add up the bill, a tax pulse will be provided sequentially from each of the first three repeating gates which will take the bill up to $2.72. As the count in the subtotal accumulator STA continues up to $2.99, a pulse will again be provided by the $.99 gate which will again try to set the flip-flop device FF1, already "set" so nothing will happen, and will trigger the ring counter SRC to position two. Now, the ring counter SRC will disable the first repeating set of gates while it will supply an enabling voltage to each of the second repeating set of gate input leads. A tax pulse will be provided by each of the second set of repeating gates as the subtotal accumulator arrives at the count corresponding to each of these tax break gates. As the subtotal accumulator STA reaches $3.99, an output pulse will again be provided by the $.99 gate which will have no effect on the set flip-flop device FF1, but, will trigger the step ring counter SRC from position two back to position one. Once again, the first set of repeating gates will become enabled while the second set will again become disabled. This will continue, repeating itself as long as the subtotal is being accumulated. The purpose of the ring counter SRC having more than two positions is to allow the tax computer to function in cases where there are three or more repeating sets of tax gates.

Thus, in the system of FIGS. 2 and 2A, as described, the running tax will be accumulated in step with the subtotal price. Simultaneously, the total price and the running tax will be combined in the accumulated total price accumulator TPA.

One multipulse generator suitable for use in the system of FIGS. 2 and 2A to produce four pulses with one trigger input pulse is shown in FIG. 3. As shown therein, four one-shot delay generators $DG_1$ to $DG_4$, which may be of any of the types known in the prior art, are cascaded and connected through the trigger device TR1 to the output of the $1.00 gate (FIG. 2). Each delay generator output is differentiated in an RC differentiator and passed through an isolation diode ID which will pass negative going pulses. The outputs of each of the diodes are connected to a common output bus.

With the initiation of a trigger pulse to the first delay generator DG1, the negative going trailing edge of the stretched pulse output therefrom is branched off in two directions; through the RC differentiator and through the delay generator DG2. As can be seen, the output each delay generator will cause the following delay generator to be fired at the trailing edge of the pulse and the pulse width will determine the time interval. Thus, four negative pulses will arrive at the pulse output, each spaced by the pulse width of the output of the delay generators. This system does not require a clock frequency.

An alternative multipulse generator arrangement, shown in FIG. 4, uses a clock frequency or oscillator CO and a 4-step ring counter 4RC. The output of oscillator CO, which is always running, and the output of a flip-flop device FF3 are connected to the input of an AND gate AG. When the $1.00 gate (FIG. 2), connected to flip-flop FF3, has an output or is transmitting, such output will trigger or "set" the gate flip-flop FF3 to enable the AND gate AG. Gate AG will now pass pulses from the clock oscillator CO to the trigger TR3 which will cause the 4-step ring counter 4RC, which has been at zero, to now step one position with each incoming pulse. Each step position output of counter 4RC will pass a negative pulse into the pulse output bus at a frequency determined by the clock oscillator CO. When the ring counter 4RC has stepped to its fourth position, an output from position four will reset gate flip-flop FF3 to disable the AND gate AG and terminate the pulse output of the 4-pulse generator. The ring counter 4RC will be reset to zero with the "System Reset" signal when computation is completed.

By use of the adjustable breaks, that is, the connection of the input AND tax break gates to different outputs of the sub-total running accumulator STA, the proper selection of the number of pulses which are produced by the multipulse generator MG in the output of the selected tax gate breaks and the use of repeating and non-repeating gates controlled by an additional step ring counter and associated flip-flop devices operating in the manner described, the computation system in accordance with FIGS. 2 and 2A would be suitable for use in nearly all areas or locales having a tax on sold commodities or services.

Various modifications of the circuits which have been illustrated and described, which are within the spirit and scope of the invention, will be apparent to persons skilled in the art.

What is claimed is:

1. In combination in a tax computing and billing system, a source of individual pulses in number representing information on the total price before tax charged for a number of items sold on a single order to a customer, three accumulators each composed of a number of ring counters in decade configurations, means for applying the pulses from said source to the inputs of a first and a second of said accumulators causing them to count and store this information providing respectively a subtotal running and a total running price on the order, a plurality of multi-input AND gates representing different tax breaks in the tax laws of the community in which the sale is made, respectively connected to the ring counter decade outputs of said first accumulator in such manner that each gate is enabled when a sum has been counted in said first accumulator corresponding with the tax break represented by that gate, means responsive to the enablement of each gate to produce and transmit one or more pulses each equivalent to one cent, dependent on the value of the tax break, to a third one of said accumulators causing it to count and store this information as a running tax on the order, and with a given amount of delay to said second accumulator to add the tax to the total running price which has been stored therein previously by the source of pulses, to provide a total price for the order, including the tax, and a customer's bill producing means controlled from the outputs of the subtotal, tax and total price accumulators to cause all of their information to be included in the customer's bill.

2. The system of claim 5 further comprising another ring counter means connected to the source of individual pulses and to the outputs of said plurality of gates for receiving and counting pulses therefrom and for storing the counted pulses as information representing the total running price of the order including the tax thereon.

3. A tax computing and indicating system comprising in combination with a source of individual pulses quantatively representing the total price before tax of a number of items sold on a single order, ring counter means connected to said source to receive and count pulses therefrom and to store the counted pulses as information representing the total running price of the order, a plurality of multi-input gates selectively connected to the output of said ring counter means and each representing a tax break in accordance with the tax laws which the sale is subject to, control means connected to said gates and together with the output of said ring counter means enabling each of said gates to provide a pulse output the pulses of which quantatively represent the tax at such tax break when said counter means counts the total price of the sale equal to such tax break, counting means connected to the output of said gates for receiving and counting pulses therefrom and for storing the counted pulses as information representing the total tax on the order, and said control means including a multipulse generator in the output of at least one of said gates and controlled by the pulse output therefrom to generate and transmit to said counting means the proper number of pulses quantatively representing the tax at the associated tax break when more than one of such tax representing pulse is required.

4. A tax computing and indicating system comprising in combination with a source of individual pulses quantatively representing the total price before tax of a number of items sold on a single order, ring counter means connected to said source to receive and count pulses therefrom and to store the counted pulses as information representing the total running price of the order, a plurality of multi-input gates selectively connected to the output of said ring counter means and each representing a tax break in accordance with the tax laws which the sale is subject to, control means connected to said gates and together with the output of said ring counter means enabling each of said gates to provide a pulse output the pulses of which quantatively represent the tax at such tax break when said counter means counts the total price of the sale equal to such tax break, counting means connected to the output of said gates for receiving and counting pulses therefrom and for storing the counted pulses as information representing the total tax on the order, and said control means including a multi-position step ring counter means having a number of outputs respectively connected to the inputs of successive groups of the plurality of said gates and responsive to the enablement of one of the gates when said ring counter means connected to the source of pulses counts a total running price equal to the tax break represented by that gate to step said multiposition step ring counter means from position-to-position as the gates of one of such groups of gates become enabled to in turn enable gates at a succeeding group thereof.

5. A tax computing and indicating system comprising in combination with a source of individual pulses quantatively representing the total price before tax of a number of items sold on a single order, ring counter means connected to said source to receive and count pulses therefrom and to store the counted pulses as information representing the total running price of the order, a plurality of multi-input gates selectively connected to the output of said ring counter means and each representing a tax break in accordance with the tax laws which the sale is subject to, control means connected to said gates and together with the output of said ring counter means enabling each of said gates to provide a pulse output the pulses of which quantatively represent the tax at such tax break when said counter means counts the total price of the sale equal to such tax break, counting means connected to the output of said gates for receiving and counting pulses therefrom and for storing the counted pulses as information representing the total tax on the order, and said gates being divided into a set of nonrepeating gates and at least two sets of repeating gates, and said control means includes a first flip-flop means initially set so as to apply an enabling voltage on all nonrepeating gates only and responsive to the enablement of a selected one of the nonrepeating gates when a sum is counted in said ring counter means equal to the tax break represented by that gate to cause all the nonrepeating gates to become disabled while all the repeating gates will have an enabling voltage present at one of their inputs, a second flip-flop means which is set by the enablement of another of said nonrepeating gates when a sum is counted in said ring counter means equal to the tax break represented by said other gate to supply an enabling voltage input to said selected one of said nonrepeating gates, and a multiposition step ring counter means which is stepped from position-to-position in response to the enablement of said selected one gate to switch the control of the enabling voltage input between said two sets of repeating gates.

6. A tax computing and indicating system comprising in combination with a source of individual pulses quantatively representing the total price before tax of a number of items sold on a single order, ring counter means connected to said source to receive and count pulses therefrom and to store the counted pulses as information representing the total running price of the order, a plurality of multi-input gates selectively connected to the output of said ring counter means and each representing a tax break in accordance with the tax laws which the sale is subject to, control means connected to said gates and together with the output of said ring counter means enabling each of said gates to provide a pulse output the pulses of which quantatively represent the tax at such tax break when said counter means counts the total price of the sale equal to such tax break, counting means connected to the output of said gates for receiving and counting pulses therefrom and for storing the counted pulses as information representing the total tax on the order, and said control means comprising a multistep ring counter means having an input connection to the output of a selected one of said gates and plurality of outputs respectively connected to one input of the gates in two different groups thereof, said step counter being stepped in response to enablement of said selected one gate from position-to-position as the gates at one tax level become enabled to in turn enable the gates in the two groups at a succeeding tax level.

7. A tax computing and indicating system comprising in combination with a source of individual pulses quantatively representing the total price before tax of a number of items sold on a single order, ring counter means connected to said source to receive and count pulses therefrom and to store the counted pulses as information representing the total running price of the order, a plurality of multi-input gates selectively connected to the output of said ring counter means and each representing a tax break in accordance with the tax laws which the sale is subject to, control means connected to said gates and together with the output of said ring counter means enabling each of said gates to provide a pulse output the pulses of which quantatively represent the tax at such tax break when said counter means counts the total price of the sale equal to such tax break, counting means connected to the output of said gates for receiving and counting pulses therefrom and for storing the counted pulses as information representing the total tax on the order, and said gates being divided into a set of nonrepeating gates and at least two sets of repeating gates, said control means including a step ring counter means having an input connected to the output of a selected one of the nonrepeating gates and two or more outputs respectively connected to the inputs of the gates in the two repeating sets, said step ring counter means being responsive to the enablement of said selected one gate to be stepped from position-to-position as the gates at one tax level become enabled to in turn enable the gates in one of the two sets of nonrepeating gates at a succeeding tax level.

8. A tax computing and indicating system comprising in combination with a source of individual pulses quantatively representing the total price before tax of a number of items sold on a single order, ring counter means connected to said source to receive and count pulses therefrom and to store the counted pulses as information representing the total running price of the order, a plurality of multi-input gates selectively connected to the output of said ring counter means and each representing a tax break in accordance with the tax laws which the sale is subject to, control means connected to said gates and together with the output of said ring counter means enabling each of said gates to provide a pulse output the pulses of which quantatively represent the tax at such tax break when said counter means counts the total price of the sale equal to such tax break, counting means connected to the output of said gates for receiving and counting pulses therefrom and for storing the counted pulses as information representing the total tax on the order, and said gates including a set of nonrepeating gates and at least two sets of repeating gates, and said control means include two flip-flop devices, and a multiposition step counter means having an input connected to the output of one of the nonrepeating gates and at least two outputs respectively connected to the inputs of the gates in the two repeating sets, said flip-flop devices being operative to properly control the enablement of the nonrepeating and repeating gates and said multiposition step ring counter being stepped from position-to-position as the gates at one tax level are enabled to in turn enable the gates in the two repeating sets at a succeeding tax level.

References Cited by the Examiner

UNITED STATES PATENTS

| | | | |
|---|---|---|---|
| 2,845,617 | 7/1958 | Turvey | 340—347 |
| 2,910,240 | 10/1959 | Havens | 235—92 |
| 3,075,189 | 1/1963 | Lisicky | 343—7.3 |
| 3,081,031 | 3/1963 | Livesay | 235—92 |
| 3,084,285 | 4/1963 | Bell et al. | 235—92 |

ROBERT C. BAILEY, *Primary Examiner.*

I. S. KAVRUKOV, *Assistant Examiner.*